United States Patent [19]

Overs et al.

[11] Patent Number: 4,713,967
[45] Date of Patent: Dec. 22, 1987

[54] METHOD AND APPARATUS FOR MEASURING A WATER CONDITION

[75] Inventors: Ronald R. Overs, 96 Fox Hunt La., East Amherst, N.Y. 14051; Darold Wobshall, Williamsville, N.Y.

[73] Assignee: Ronald R. Overs, East Amherst, N.Y.

[21] Appl. No.: 846,248

[22] Filed: Mar. 31, 1986

[51] Int. Cl.$^4$ .................. G08C 19/00; H04B 3/46
[52] U.S. Cl. .................. 73/170 A; 73/187; 374/136; 43/4
[58] Field of Search .............. 73/170 A, 184, 185, 73/300, 187; 374/136; 43/4, 4.5; 340/850, 854, 855, 859, 861

[56] References Cited

U.S. PATENT DOCUMENTS

| | | | |
|---|---|---|---|
| 2,316,942 | 4/1943 | Doll | 73/154 X |
| 2,473,713 | 6/1949 | Kingston et al. | 73/152 |
| 2,957,159 | 10/1960 | Fitchette | 340/850 X |
| 3,374,434 | 3/1968 | Perry | 340/850 X |
| 3,494,186 | 2/1970 | Johns et al. | 73/170 A X |
| 3,808,731 | 5/1974 | Lowrance | 43/4 |
| 3,925,749 | 12/1975 | McLaughlin et al. | 340/870.18 X |
| 4,399,695 | 8/1983 | Peyton | 73/185 |
| 4,555,938 | 12/1985 | Boucher et al. | 73/187 |
| 4,620,189 | 10/1986 | Farque | 73/155 X |

OTHER PUBLICATIONS

J. L. Riley, "A Digital Frequency-to-Temperature Converter . . . ", IEEE Trans. Biomed. Eng., vol. BME 26, No. 11, Nov. 1979, pp. 630–634.

Primary Examiner—Charles A. Ruehl
Attorney, Agent, or Firm—Michael L. Dunn

[57] ABSTRACT

A method for measuring a water condition such as temperature or speed proximate a desired location in the water such as near a fishing bait. The method comprises positioning a sensor for the condition near the location which provides a signal proportional to the condition, modulating a high frequency radio signal using the electrical signal, transmitting the modulated signal along a conductive line, detecting the modulated signal and using the detected signal to drive an observable indicator of the condition. The invention also includes an apparatus for practicing the method of the invention. The apparatus includes a sensing means, a modulating means, a transmitting means, a detecting means and a means for converting the detected signal to an observable indication of the condition.

18 Claims, 9 Drawing Figures

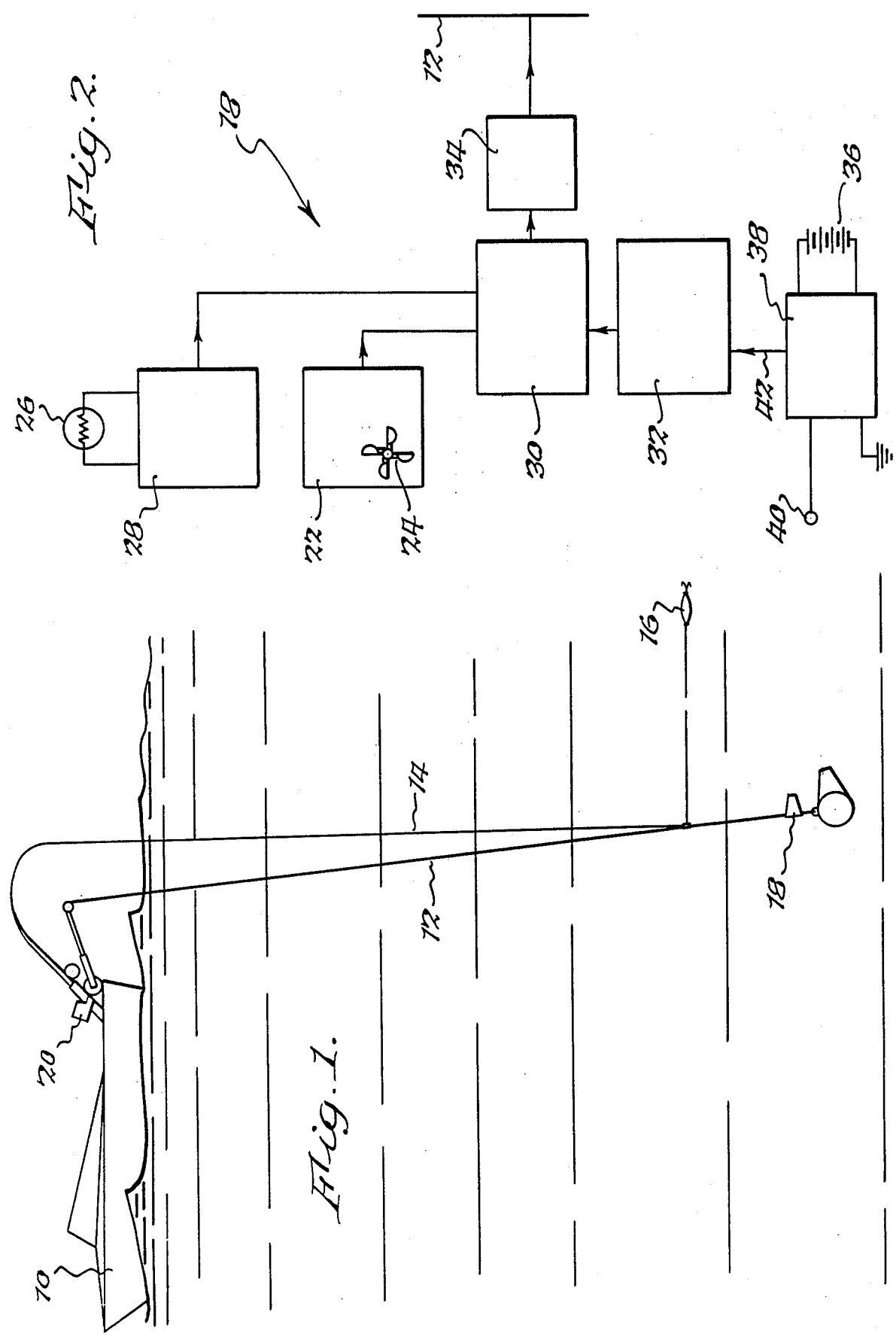

METHOD AND APPARATUS FOR MEASURING A WATER CONDITION

BACKGROUND OF THE INVENTION (a) Field of the Invention

This invention relates to the measurement of a water condition and more particularly relates to the measurement of a water condition at a remote location.

(b) History of the Prior Art

In the prior art, various methods and apparatus have been developed for measuring a water condition at a remote location. Such methods and apparatus in the prior art frequently had serious disadvantages. Such disadvantages, for example, include complexity, inaccuracy, lack of reliability or inability to consistently transmit reliable information from the remote location.

An example of one such method and apparatus is described in U.S. Pat. No. 4,399,695 to Peyton. The apparatus disclosed in that patent requires that a pulse signal be transmitted through the water to indicate water speed proximate fishing gear being trolled through the water. Such an apparatus has serious deficiencies since it is known that transmitting electrical signals through the water is difficult due to the grounding effects of water and is sometimes unreliable. In addition, the strength of the signal will vary depending upon the body of water. Electrical signals through saline water, for example, vary in strength from signals through fresh water. The same patent suggests that sonic signals could be transmitted. Apparatus for accurate sonic transmission is undesirably complex and interference and signal alterations due to exterior sonic sources, water densities and even currents can occur.

It is also known to transmit electromagnetic radiations through the water to provide information. This is, however, very difficult and has not been considered suitable over anything except short distances when simple low power devices are used. This is due to very rapid decay of electromagnetic signals through water, see e.g. U.S. Pat. No. 4,159,644.

There is, therefore, a need for a simple device to detect and transmit information concerning a water condition, e.g. speed, temperature, electrical conductivity, pressure, etc. Such a device would be useful in measuring numerous water conditions including water speed, temperature, depth and salinity. The knowledge of such conditions has applications including fishing, pollution control, process control and environmental studies.

BRIEF DESCRIPTION OF THE DRAWINGS

FIG. 1 is a side view of a boat fitted with the apparatus of the invention.

FIG. 2 is a block diagram showing the major functions of a preferred embodiment of the underwater section of the apparatus.

BRIEF DESCRIPTION OF THE INVENTION

Figure 3:
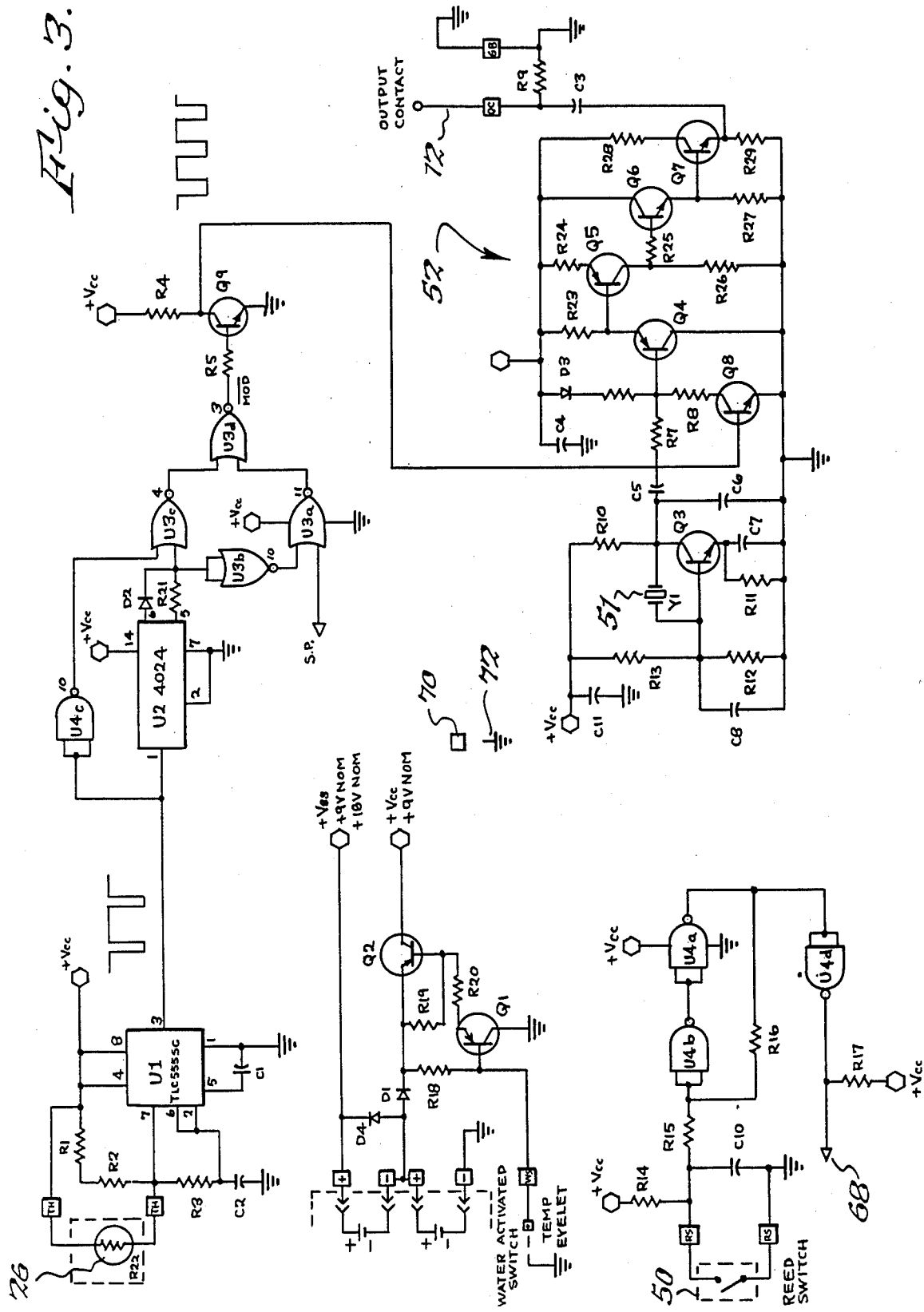
FIG. 3 is a schematic diagram of the electronics of a specific embodiment of the underwater section of the invention.

There is therefore provided, in accordance with the present invention, a method and apparatus for simply and readily sensing a water condition and transmitting information to a remote location to indicate such condition.

In particular, the invention comprises a method for measuring at least one water condition proximate a desired location in the water. The method comprises positioning a sensor for such condition proximate the location. The sensor provides an electrical signal proportional to the condition. The signal is imposed upon a high frequency radio carrier wave to form a modulated signal which is then transmitted along a conductive line. The modulated signal is detected from the line and is converted into an observable indication of the condition.

The apparatus of the invention comprises a sensing means proximate the location to provide an electrical signal proportional to the condition; means for modulating a high frequency radio signal with the electrical signal; means for transmitting the modulated radio signal along a conductive line; means for detecting the signal from the line and means for converting the detected signal to an observable indication of the condition.

DETAILED DESCRIPTION OF THE INVENTION

The method and apparatus of the present invention reduce or eliminate problems associated with prior art methods and apparatus to detect and transmit information concerning a water condition.

The sensor or sensing means comprises any sensor which provides an electrical signal in response to a water condition. An example of such a sensor is a transducer which rotates in response to water velocity to provide an electromagnetic signal proportional to speed. Another example is a depth sensor, e.g. a Bourdon tube connected to a variable capacitor, resistance or inductance in an electrical circuit so that electrical circuit characteristics vary with pressure thus providing a variable signal through the circuit in response to pressure.

A further example of such a sensor comprises a thermistor which provides a variable resistance in a circuit in response to water temperature thus providing a variable signal through the circuit in response to temperature.

The location of the sensor is in the water at a location remote from the location where the water condition is indicated. It is, for example, anticipated that the most common use of the invention will be for determining a water condition proximate a fishing bait. "Fishing bait" as used herein includes both live bait and artificial lures. In such a case the indicator of the condition would most commonly be in a boat and the conductive line would most commonly be a metal fishing or down rigger line. In the case of fishing, it is desirable to know water speed past a bait, water temperature and bait depth. All of these water conditions can be easily detected proximate a fishing bait and transmitted to an indicator in a boat.

In contrast to prior art methods, the electrical signal which carries the information concerning the water condition is imposed upon a high frequency radio signal. The radio signal is then conducted along the conductive line to the remote location such as a boat. The radio signal is then demodulated at the remote location to recover the signal containing the information concerning water condition. This recovered signal is then used, in amplified or otherwise modified form, to drive an observable indicator of the condition.

Any high frequency radio signal may be used in accordance with the present invention; however, it has been found that frequencies of between 0.5 and 5 megahertz are particularly suitable.

The signal from the sensor may be imposed upon the radio signal by any suitable means including amplitude or frequency modulations or combinations thereof. Prior to imposing the sensed signal upon the radio signal, it may be modified in any desirable way including amplification or digitization. The final sensed signal which is imposed upon the radio signal may therefore be in either analog or digital form. Digital form has been found to be particularly desirable because information concerning numerous conditions can be essentially simultaneously transmitted. In the case of measurement of a condition proximate a fishing bait, a low power radio signal may be used, e.g. desirably as low as between 10 and 1000 milliwatts.

At the remote location the radio signal is demodulated to recover the final sensed analog or digital signal containing the information concerning water condition. This signal may be further modified by amplification or analysis to provide a signal which drives an observable indicator. The observable indicator is most commonly a visual display but may also be a sonic signal. Suitable visual displays include lights, LED, LCD and CRT displays as well as mechanical gauges.

The underwater instrumentation system of the present invention may be used by fisherman to determine water conditions down at the lure depth to improve their chances for a catch. Typically used while trolling, this system supplies a continuous stream of measurements of water condition, especially speed and temperature around the lure or other bait. The data may be sent over a single metallic conductor which acts as a communications link and down rigger. The data can be used to detect sub-surface currents and temperature layers beneath the surface. The system is adaptable to any common down rigger configuration and can be used on any type of craft without lengthy installation procedures.

The apparatus of the invention is generally made up of two major sections. The first section is the submersible or detection, modulation and transmitter section which is fastened to the conductive line at the desired underwater location. This unit desirably digitally encodes the water conditions such as the temperature and speed information and transmits it up the conductive line by means of a radio frequency carrier signal as previously discussed.

The second section, also called the receiver section, is usually out of the water and is made up of a receiver, decoder and display which are on the fishing vessel and present the data in readable, observable form either at the equipment or remotely from it. Their functions are:

1. The receiver amplifiers and detects the carrier signal from the first section.
2. The decoder demodulates and converts the coded modulation on the carrier and puts it into data format.
3. The display assembly presents a continuous, usually visual, presentation of speed and temperature data.

In the case of fishing, by utilizing a conductor, which may or may not be insulated, to serve both as a down rigger line and communications link, the desired conditions, e.g. speed and temperature readings near the lure, can be obtained with a minimum of disturbance to the fishing activity. In addition, the data is obtained below the surface and represents an accurate picture of the conditions around the lure. As it is lowered to various depths, the system follows the lure and tracks current and temperature changes at varying distances below the surface.

A preferred embodiment of the method and apparatus of the present invention is illustrated in the drawings.

FIG. 1 shows a boat 10 provided with a conductive down rigger 12 to which is attached a fishing line 14 having attached bait 16. A first section 18 is provided underwater near the bottom of down rigger 12 which provides electrical signals proportional to water speed and temperature and imposes them upon a radio signal.

The radio signal is directed along down rigger 12 to boat 10. A second section 20 on boat 10 detects and demodulates the radio signal and displays water speed and temperature.

The underwater section 18 of the preferred embodiment is housed in a tubular body to enhance its easy flow through the water and is fastened near the lure 16 on the down rigger line 12.

FIG. 2 shows the major functions of the underwater section 18. Transmitter and encoding circuits are housed inside and are battery powered. In particular, as seen in FIG. 2, the underwater section 18 comprises a transducer 22 and associated circuits which include a paddle wheel 24 which either rotates within a magnetic field in response to water velocity, to provide an electrical signal proportional to speed or rotates to open and close a switch to provide a pulse signal proportional to speed. When the signal is an analog signal, associated circuits desirably convert the signal to a pulse. A thermistor 26 is provided which in conjunction with associated circuits 28 provides a pulsed electrical signal to indicate water temperature.

Switch and modulator circuits 30 are provided to modulate a carrier wave provided by carrier oscillator circuit 32 with a pulse signal from either transducer 22 or thermistor circuit 28 as determined by the switch. The modulated signal is amplified by driver circuit 34 and is then imposed upon down rigger line 12.

Underwater section 18 is powered by a battery 36. This battery is typically a 9 volt alkaline version of 0.4 Amp-hour capacity. It is utilized only when the underwater section is in the water. A sensing circuit 38 detects when the underwater section 18 is immersed by means of water contact 40 and connects the battery to the rest of the circuit through path 42. Otherwise, there is no battery drain. Battery life is further extended by the use of CMOS circuits and low power circuit techniques.

Referring to FIG. 3 of the schematic, we can see the schematic arrangement of the speed and temperature circuits and the RF generator and modulator of a specific embodiment of the invention. The temperature sensor is the thermistor 26 connected across pins 4 and 7 of U1. U1 is a 555 timer which is configured as an astable oscillator. The series combination of R1 and R2 in parallel with the thermistor make up the variable resistance which determines the frequency of the oscillator. C2 is the capacitor which makes up the necessary time constant in conjunction with the resistance mentioned above. With good thermal coupling to the surrounding water, the thermistor reacts to the water temperature and its resistance changes accordingly. A rise in water temperature lowers the resistance. As a result, the frequency generated by U1 changes as a measure of the water temperature. This frequency not only denotes the water temperature, but becomes the basic timer for establishing the entire data transmission rate.

Figure 4:
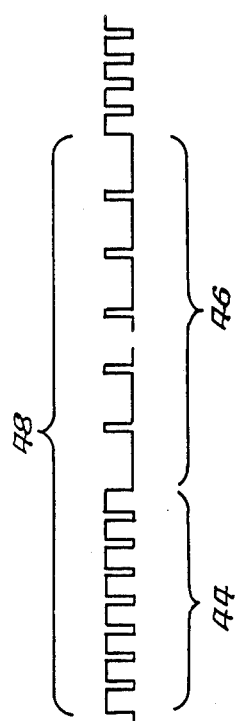
FIG. 4 is a timing diagram showing a transmission frame of a signal from a specific embodiment of the underwater section.

As seen in FIG. 4, eight periods of this frequency make up the duration of the temperature indicating block 44, while the succeeding 24 periods make up the speed measuring block 46, as seen in FIG. 4. These blocks alternate. One set makes up a transmission frame 48, transmitting both the temperature and speed data. The transmission frame is based upon the frequency of U1 which in turn is dependent upon the temperature of the water. Thus data is transferred at a faster rate in warmer water. The range of water temperatures measured is typically from 32° F. to 100° F.

The devices used to generate this pattern are integrated circuits U2, U3 (*a, b, c* and *d*) and the c section of U4. U2 is a binary counter which continuously counts the pulses from U1. The Q4 and Q5 outputs are combined to produce a waveform which is high for 24 of U1's periods and low for 8 of them. The high interval of this waveform is inverted by U3*b* and gates section U3*a* on. This transmits the speed frequency to the OR section U3*d* and from there to the modulator. The low waveform interval gates on U3C and passes the temperature burst of pulses to the OR section and onward to the modulator. Section U4*c* is merely an inverter to provide the correct polarity of pulses for gating function of U3*c* and the ORing operation in U3*d*.

The speed pulses are derived from the opening and closing of a reed switch 50 in a paddle wheel assembly 24 rotated by the passing water. The paddle wheel has permanent magnets attached to it. As the paddle wheel turns, the magnets cause the reed switch contacts to open and close. The reed switch 50 interrupts a current through R14 generating a pulse rate proportional to the water speed. These pulses are shaped by sections U4*a* and U4*b* acting as a Schmitt trigger. These shaped pulses in turn are inverted by U4*d* and differentiated before being applied to the input of U3*a*. The dimensions of the paddle wheel 24 and magnets provide 3.6 pulses per second per mile per hour.

The RF signal which is sent up the line to the boat is generated by Q3, an NPN transistor acting as a crystal controlled oscillator 51. The crystal frequency is selected to be suitable for RF communications with a minimum of loss up the down rigger line. The oscillator circuit is a standard configuration and its output is fed to the modulator and RF amplifier section 52. Q8 within this section operates as the modulator and Q4, Q5, Q6 and Q7 operates as RF amplifier stages.

The mix of speed and temperature pulses coming from U3*d* pin 3 modulates the RF carrier sending a series of RF signals through coupling capacitor C3 to the line 12 and on up to the boat.

Q1 and Q2 make up the battery switching circuit. The 9 volts supplied by the battery are gated on and off by Q2. When Q2 is off, the battery is effectively disconnected from the rest of the circuits. Q1 controls Q2. When the base of Q1 is brought toward ground, it turns on Q1 and in turn Q2. Q1 is turned on when the base connection is grounded by the conduction of the water surrounding the underwater section. A metal contact such as an insulated screw head in the section housing wall provides the interface to the water. By tying the base of Q1 to it, Q1 is turned on and the battery is connected to the circuitry whenever the underwater section is immersed in water.

Figure 5:
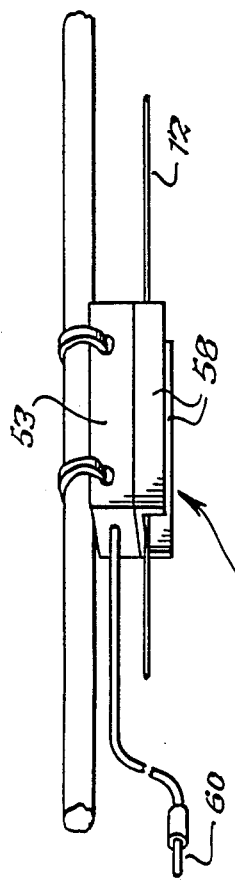
FIG. 5 is a perspective view of a specific embodiment of an antenna pickup and preamplifier of the receiver section of the invention.
Figure 6:
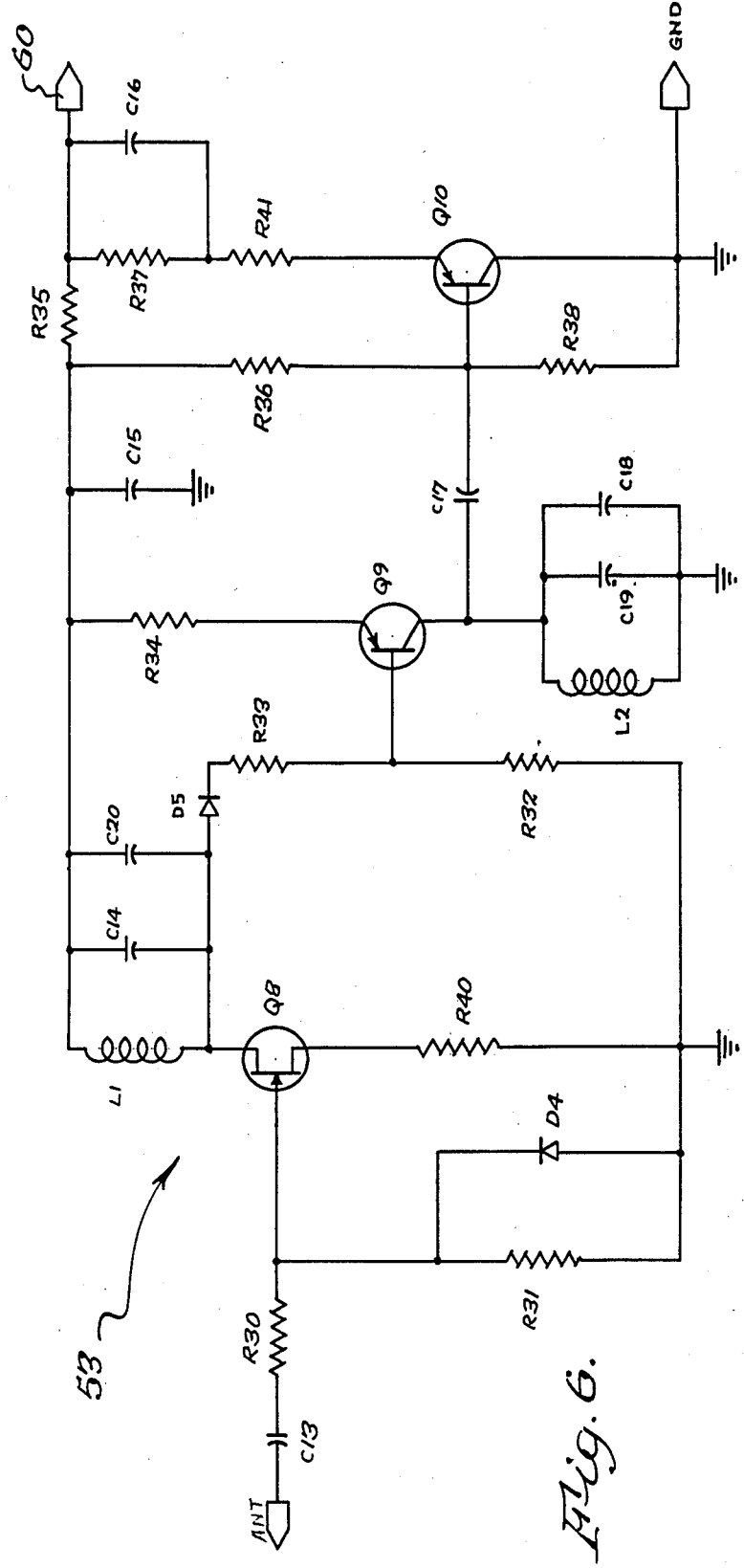
FIG. 6 is a schematic diagram of the electronics of the preamplifier.
Figure 7:
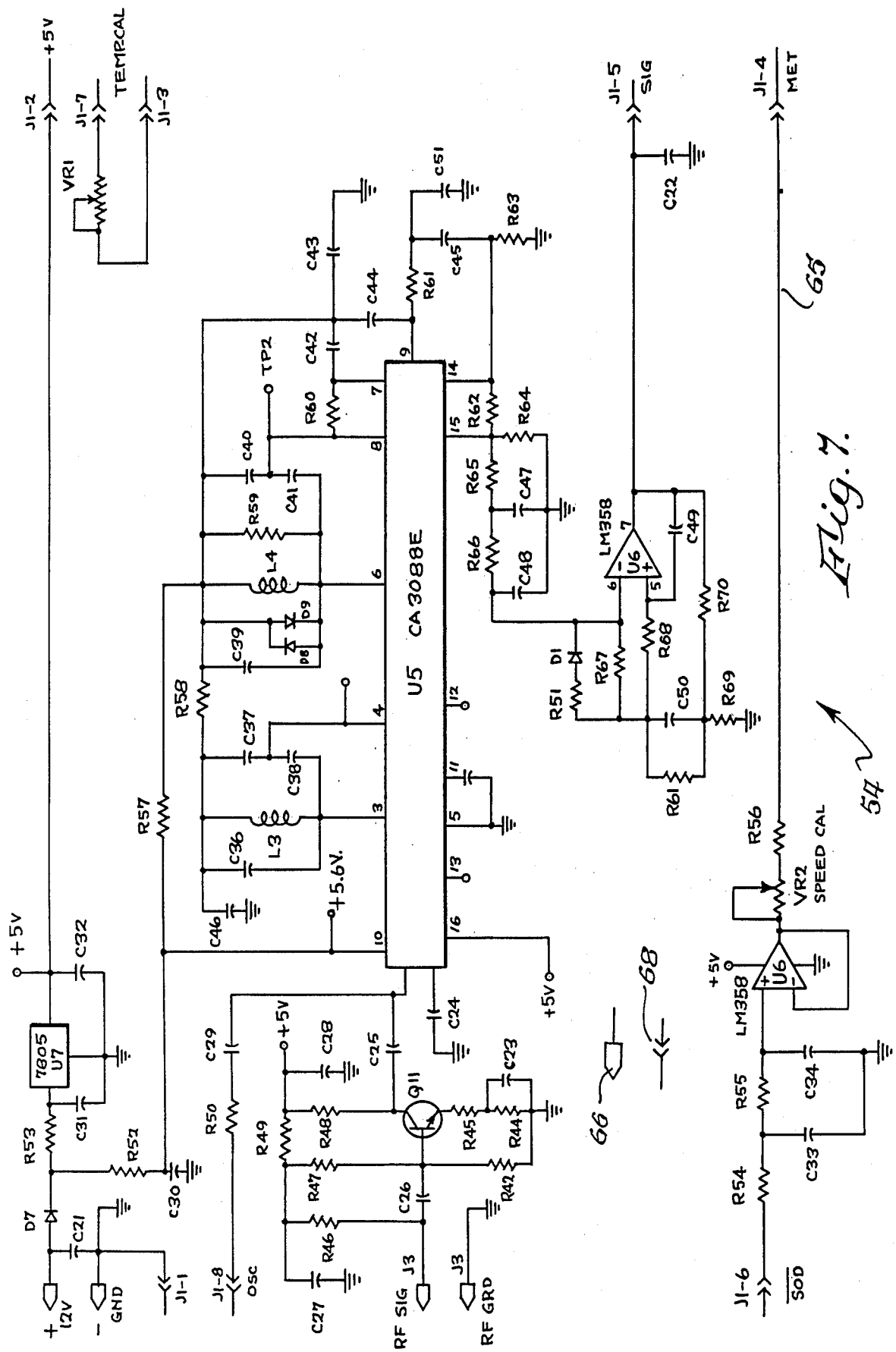
FIG. 7 is a schematic diagram of the main receiver portion of the receiver section of a specific embodiment.

The receiver section 20 of the specific preferred embodiment comprises a preamplifier 53 as seen in FIG. 5, the schematic of which is shown in FIG. 6, and main receiver 54, the schematic of which is shown in FIG. 7. The preamplifier 53 is mounted on the antenna assembly 56. The antenna itself is a U shaped channel 58. This channel 58 straddles the down rigger line 12 and picks up the RF energy from it. There is no direct contact with line 12. The preamplifier 53 amplifies this energy before passing it on to the main receiver section 54. The preamp board schematic, FIG. 6, illustrates its operation.

The signal from the antenna 56 is coupled to the gate of the input FET thru C13 and R30. This stage, Q8, has a tuned circuit in the drain lead resonated to the RF carrier. This tuned stage, using L1, C14 and C20, not only amplifies the input signal, but also discriminates against interfering signals. This amplified signal passes through diode D5 and R33 to the base of Q9, a PNP transistor connected as another tuned gain stage. D5 also provides the biasing required to operate Q9 in a linear mode. The tuned circuit is made up of L2 and C18 and C19. This tank circuit acts as a load for Q9 and the signal developed across it is coupled through C17 to the base of Q10.

This stage is an emitter follower with a somewhat unique emitter circuit. Since Q10 is a PNP transistor, its collector can be grounded and the emitter tied to the supply voltage through appropriate emitter resistors. R37 and R41 make up the DC load in the emitter. However, R37 is bypassed by C16. This allows the RF signal on Q10's emitter to be coupled to the voltage supply line 60.

By superimposing this signal on the power line 60, only two conductors are required to supply power to the preamplifier 53 as well as transmit the signal to the receiver. This allows a single shielded or coaxial cable to serve both purposes. C15 is a decoupling capacitor used to prevent the signal on the power line from being coupled back to the input stages. This would cause circuit instability.

The main receiver section as shown in FIG. 7 amplifies the RF signal, detects it, and processes the resulting pulses to prepare them for use by a microprocessor 64 as seen in FIG. 8. The RF signal which is superimposed upon the power bus, is connected to the receiver through J3. The receiver board schematic shows the interface labelled "RF SIG".

The receiver board schematic shows how the power supply voltage is delivered to the preamplifier through R46 and R49. C26 blocks the DC voltage and delivers the RF signal to the base of Q11, the transistor used in this gain stage.

The output of this stage is developed across the load resistor R48 and fed to the converter input of U5. A fixed frequency to beat with the RF signal is also fed to the same pin. These two signals are heterodyned in U5 to produce the product terms, which generate the IF signal within U5. U5 is an RCA CA3088. This is an AM receiver subsystem integrated circuit. The IF stages of U5 are typically tuned to 508 khz. The first IF input is tuned by L3 and C36, C37, and C38. The input to the second IF stage is tuned by L4 and C39, C40 and C41. The detected output signal is available on pin 9 of U5. High frequency components are attenuated by R61 and C51. The resulting signal is coupled through C45 to the audio amplifier section also built into U5. After audio amplification, the resulting signal is available on pin 15 where it again is filtered through two RC sections made up of R65, C47 and R66, C48.

The signal from the junction of R66 and C48 is fed to the inverting input of the operational amplifier U6. This amplifier is configured to act as a self adjusting pulse comparator. By feeding back the output pulse signal from pin 7 to an RC filter network, the switching threshold for the comparator is allowed to change in accordance with the average amplitude of the signals being fed from U5. This dynamic action reduces the possibility of erroneous pulse data being generated by various pulse amplitudes.

The threshold floats to reduce the possibility of saturating the comparator on strong signals or having too high a threshold for weaker signals. The time constant for this action is set primarily by R51 and C50. C49 helps roll off the high frequencies and reduce susceptibility to noise. As a consequence of this action, a stream of constant amplitude pulses are fed from pin 7 of U6 at J1-5 to the readout microprocessor 64. Line 65 goes to the speed display.

The power supply section for the system is shown in FIG. 7. The nominal +12 volts from the boat battery is decoupled by C21, isolated by D7 and then distributed to two points. The first is the input of a fixed voltage regulator, U7, which provides +5 volts for use by the preamplifier, U5, Q11, U6 and all the digital components including the 8085 microprocessor.

The second branch of the 12 volt feed is through R52 to pin 10 of U5. This pin ties to a 5.6 volt zener diode within U5 and provides a regulated +5.6 volts for the IF stages of U5 as well as circuitry internal to U5. Symbol 66 designates an off board connection and symbol 68 designates a between board connection.

Figure 8A:
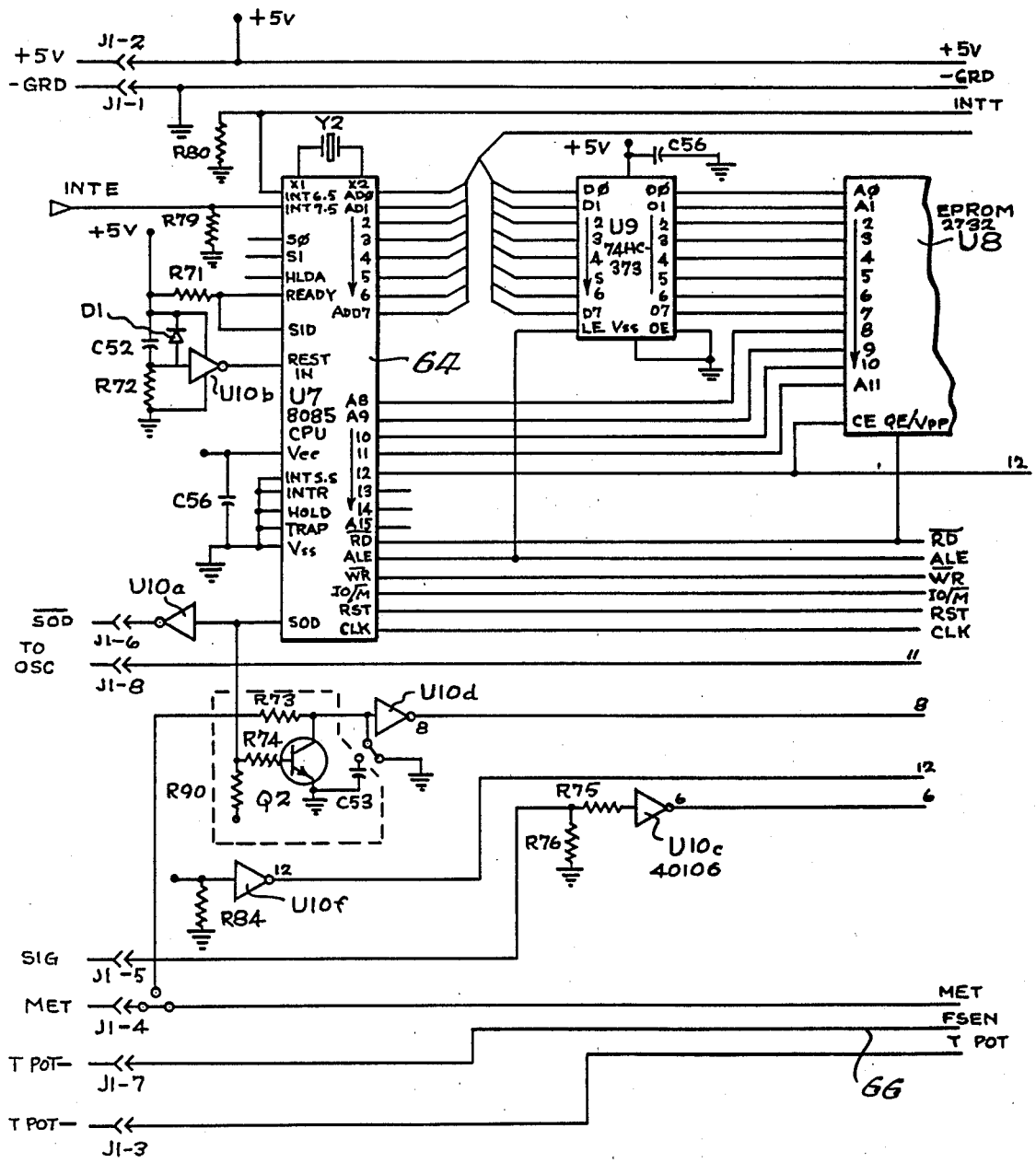
FIGS. 8A and 8B are a schematic diagram of the microprocessor portion of the receiver section of a specific embodiment.
Figure 8B:
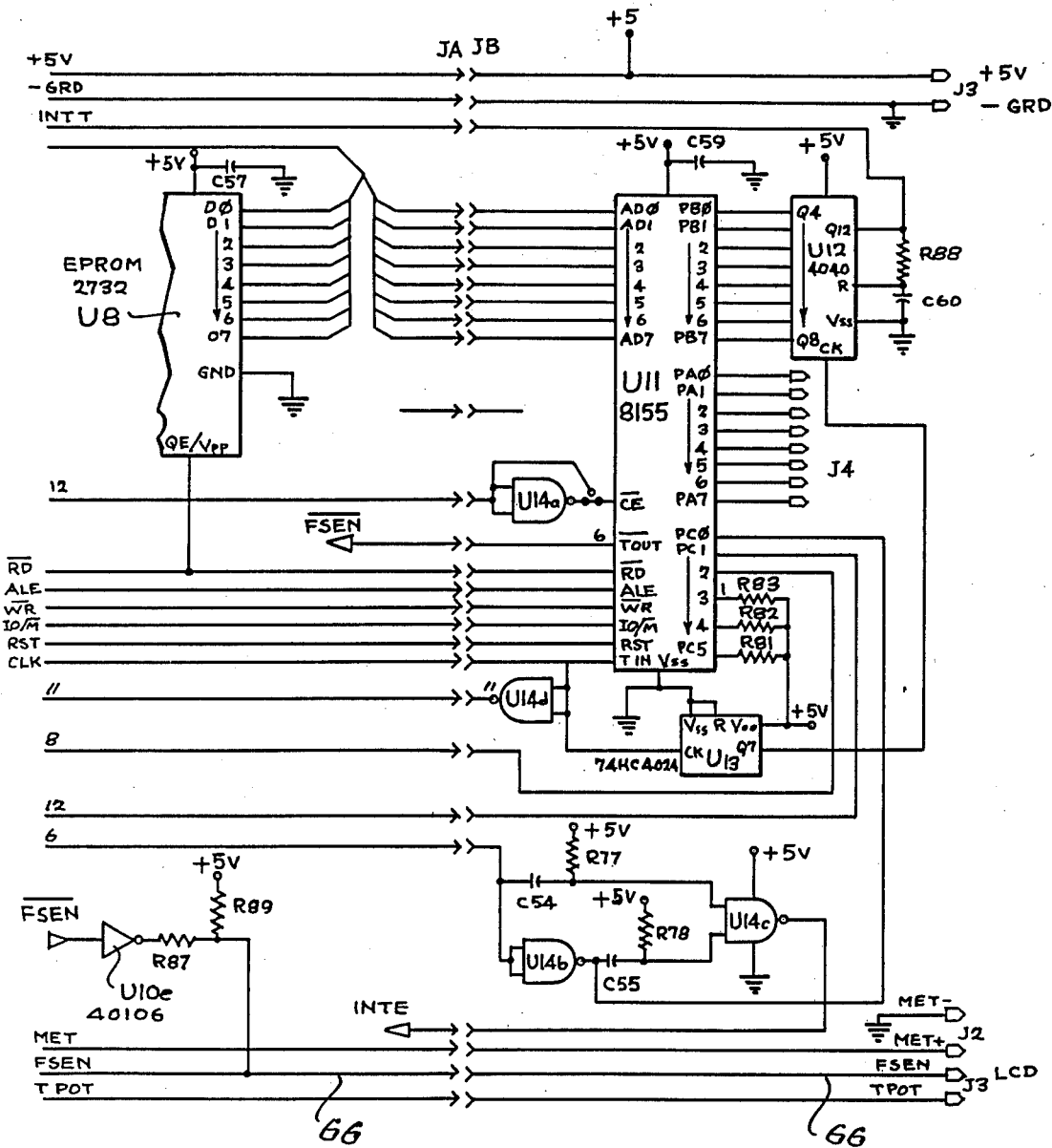

The readout microprocessor schematic is shown in FIGS. 8A and 8B. The microprocessor 64 (U7) is an 8085 with a 74HC373 latch (U9), a 2732 EPROM (U8) and an 8155 Port RAM Timer (U11). The latch and EPROM provide the program memory for the 8085. The data is multiplexed on the lower 8 bit address bus. The 8155 I.C. provides 256 bytes of RAM, three 8 bit ports and a 14 bit timer. Miscellaneous other digital IC's provide the balance of the minor functions.

The 8085 clock rate is provided by crystal Y2. The frequency of Y2 is desirably from 1 to 6 megahertz. In the system shown, the crystal runs at 6 MHz which generates a 3 MHz clock rate from the microprocessor. This clock signal (clk) from U7 is the signal referred to earlier as the fixed frequency fed into the receiver IC, the RCA CA3088 (U5, FIG. 7). This signal is used to develop other frequencies. After going through the buffer U14d the 3 MHz signal is fed to the receiver. This signal clocks U13 where it is divided by 128 to generate a 24 khz signal. This frequency, in turn, clocks the 4040 counter U12 whose outputs are read by the 8155 Port RAM Timer. This counter also generates a trigger every 83.5 ms on pin 1.

The 3 MHz signal is also used to clock the timer in the 8155. By loading a preset count into the timer input, a predetermined interval will occur until the counter counts down to zero. In the reload mode, the 8155 will generate a pulse at zero count, reload, and start counting down again. By using this technique, various square wave frequencies can be generated. These frequencies in turn, can be used to drive a liquid crystal display and present the desired readout. The output frequency of the 8155 is presented at pin 6, T out. This signal is identified as FSEN. This signal is squared up by 40106 U10e, passed through biasing network R87, R89 and sent to the LCD display over line 66.

The input signal from the receiver is shaped by U10c, a 40106 Schmitt trigger. This signal is fed to bit 0 of port C of the 8155. Two sections of U14b are used as edge detectors and generate a 7 microsecond trigger pulse for each edge of the pulses that make up the speed and temperature pulse streams. This signal is fed to interrupt input 7.5 on the 8085. Within the software, each edge is tested as either a rising or falling edge. The result of this test, in conjunction with the polarity and time since the previous edge, help identify the pulse as a temperature or speed pulse. After 8 consecutive temperature pulses are detected, the sync flag is set and the program goes through its sequence of calculating temperature and displaying it, calculating speed and displaying it, and then going back to the synchronizing cycle again. This program loop runs constantly, displaying both parameters.

Because the temperature measurement is based upon the non-linear change in thermistor resistance with temperature and the temperature oscillator frequency must be converted for the LCD display frequency, a look up table is used to make the necessary conversion. As a result, the period of the temperature pulses is noted, it is converted to a number that is loaded into the 8155 counter, and the counter is commanded to count down repeatedly generating square waves for the LCD display. The display device is a commercially available LCD which has a microprocessor attached. Entering different frequencies into the module produces the various numerical readouts. This readout shows the water temperature.

The SOD pulse output of the 8085 is fed through an inverting Schmitt trigger U10a and passed through a low pass filter (FIG. 7), into the non-inverting input of an LM358 (U6) voltage follower and through some series resistance to the analog speed meter. The series resistance includes a 10k pot used to calibrate the meter readings.

As shown in FIG. 3, 70 is a hardwire connection symbol and 77 is a common ground symbol. All diodes are IN914 or equivalent.

What is claimed is:

1. A method for measuring at least one water condition proximate a desired location in the water, said method comprising: positioning a sensor for such condition proximate said location, which sensor provides an electrical signal proportional to said condition, modulating a high frequency radio signal using said electrical signal to form a modulated radio signal, transmitting said modulated signal along a conductive line, detecting said modulated signal from the line and utilizing said detected signal to drive an observable indicator of said condition, wherein said desired location is proximate a fishing bait and the conductive line is a down rigger line.

2. The method of claim 1 wherein said condition is speed through the water, the sensor is a water speed sensor and the observable indication of the speed is provided by a visual display.

3. The method of claim 1 wherein said condition is water temperature, the sensor is a temperature sensor and the observable indication of the temperature is provided by a visual display.

4. The method of claim 1 wherein both water speed and temperature are measured proximate said bait.

5. The method of claim 1 wherein the electrical signal is converted to a digitized signal which is imposed upon the high frequency radio signal.

6. The method of claim 5 wherein the signal from the line is detected by a radio receiver and is amplified and decoded to recover the digital signal.

7. The method of claim 6 wherein the recovered digital signal is converted to a visual display.

8. An apparatus for measuring at least one water condition proximate a desired location in water which comprises:
   a sensing means proximate said location which sensing means provides an electrical signal proportional to said condition;
   means for modulating a high frequency radio signal using the electrical signal;
   means for transmitting said modulated radio signal along a conductive line;
   means for detecting said signal from the line, and
   means for converting said detected signal to an observable indication of said condition, wherein said desired location is proximate a fishing bait and the conductive line is a down rigger line.

9. The apparatus of claim 8 wherein the condition is water speed, the sensing means is a water speed sensor and the observable indication of the speed is provided by a visual display means.

10. The apparatus of claim 8 wherein said condition is water temperature, the sensing means is a temperature sensor and the observable indication of the temperature is provided by a visual display means.

11. The apparatus of claim 8 wherein both a water speed sensor and a temperature sensor are located proximate said bait as the sensing means.

12. The apparatus of claim 8 wherein a means is provided to convert the electrical signal to a digital signal and means for imposing the digital signal upon the high frequency radio signal is provided.

13. The apparatus of claim 12 wherein a detection means is provided for detecting the radio signal from the line and a decoding means is provided for recovering the digital signal.

14. The apparatus of claim 13 wherein a means is provided to process the digital signal for visual display upon a visual display means.

15. A method for measuring at least one water condition at a desired location in the water and transmitting information to a remote location to indicate such condition, said method comprising: positioning a sensor for such condition at said desired location, which sensor provides an electrical signal proportional to said condition, converting said proportional signal to a digital signal, modulating a high frequency radio signal using said digital electrical signal to form a modulated radio signal, transmitting said digitally modulated signal to the remote location along a conductive line connecting said desired location and said remote location, providing power for said modulation and transmission from a battery located underwater proximate said desired location, detecting said digitally modulated signal from the line at the remote location and utilizing said detected signal to drive an observable indicator of said condition.

16. A method for measuring at least one water condition at a desired location in the water, and transmitting information to a remote location to indicate such condition said method comprising: positioning a sensor for such condition at said desired location, which sensor provides an electrical signal proportional to said condition, modulating a high frequency radio signal using said electrical signal to form a modulated radio signal, transmitting said modulated signal to the remote location along a conductive line connecting said desired location and said remote location, detecting said modulated signal from the line at the remote location using electromagnetic induction, and utilizing said detected signal to drive an observable indicator of said condition.

17. An apparatus, for measuring at least one water condition at a desired location in water and transmitting information to a remote location to indicate such condition, which comprises:
   a sensing means at said desired location which sensing means provides an electrical signal proportional to said condition;
   means for converting the electrical signal to a digital signal;
   means for modulating a high frequency radio signal using the digitized electrical signal;
   means for transmitting said modulated radio signal along a conductive line connecting said desired location and said remote location;
   battery means located underwater proximate said desired location which battery means provides power for said modulating and transmitting means;
   means for detecting said digitized signal from the line at the remote location; and
   means for converting said detected signal to an observable indication of said condition.

18. An apparatus for measuring at least one water condition at a desired location in water and transmitting information to a remote location to indicate such condition, which comprises:
   a sensing means at said desired location which sensing means provides an electrical signal proportional to said condition;
   means for modulating a high frequency radio signal using the electrical signal;
   means for transmitting said modulated radio signal along a conductive line connecting said desired location and said remote location;
   means for detecting said modulated signal from the line at the remote location using electromagnetic induction; and
   means for converting said detected signal to an observable indication of said condition.

* * * * *